(12) United States Patent
Kohler et al.

(10) Patent No.: US 12,485,640 B2
(45) Date of Patent: *Dec. 2, 2025

(54) WARP DETECTION AND CORRECTION IN TRAVELING MULTI-LAYER PRODUCT

(71) Applicant: INTPRO, LLC, Uniontown, OH (US)

(72) Inventors: Mark H. Kohler, Uniontown, OH (US); Herbert B. Kohler, Uniontown, OH (US)

(73) Assignee: INTPRO, LLC, Uniontown, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/200,053

(22) Filed: May 6, 2025

(65) Prior Publication Data

US 2025/0289204 A1 Sep. 18, 2025

Related U.S. Application Data

(63) Continuation of application No. 19/079,917, filed on Mar. 14, 2025.

(60) Provisional application No. 63/565,315, filed on Mar. 14, 2024.

(51) Int. Cl.
*B32B 41/00* (2006.01)
*B31F 1/28* (2006.01)
*G06T 7/00* (2017.01)

(52) U.S. Cl.
CPC .......... *B31F 1/2845* (2013.01); *G06T 7/0004* (2013.01)

(58) Field of Classification Search
CPC ............................ B31F 1/2845; G06T 7/0004
USPC ............... 156/60, 64, 350, 351, 378, 379
See application file for complete search history.

(56) References Cited

U.S. PATENT DOCUMENTS

| | | | |
|---|---|---|---|
| 8,398,802 B2 | 3/2013 | Kohler | |
| 2008/0077267 A1 | 3/2008 | Ishibuchi et al. | |
| 2010/0181015 A1 | 7/2010 | Kohler | |
| 2011/0011522 A1 | 1/2011 | Kohler | |
| 2011/0209862 A1 | 9/2011 | Itoyama et al. | |
| 2015/0224733 A1* | 8/2015 | Hagler | B31F 5/04 |
| | | | 156/64 |
| 2020/0207051 A1 | 7/2020 | Tateishi et al. | |

(Continued)

FOREIGN PATENT DOCUMENTS

JP 2007112023 5/2007

OTHER PUBLICATIONS

International Search Report and Written Opinion in PCT/US2025/019961, dated Aug. 14, 2025 (40 pages).

*Primary Examiner* — Michael N Orlando
*Assistant Examiner* — Joshel Rivera
(74) *Attorney, Agent, or Firm* — Tucker Ellis LLP (57) ABSTRACT

A method of correcting post-warp in a multi-layer product under prevailing conditions includes detecting an initial warp value of the multi-layer product indicative of an initial degree of warpage therein. A moisture-conditioning setpoint is selected from among a plurality of moisture-conditioning setpoints that have been correlated to respective initial warp values and their associated post-warp values for prior-made multi-layer products, based on a comparison between the detected initial warp value and the respective initial warp values in the database. Further, the method includes adjusting a moisture content in at least one layer of the multi-layer product according to the selected moisture-conditioning setpoint.

18 Claims, 8 Drawing Sheets

(56) References Cited

U.S. PATENT DOCUMENTS

| | | |
|---|---|---|
| 2021/0039348 A1 | 2/2021 | Fujita et al. |
| 2021/0040696 A1* | 2/2021 | Kohler ..................... B31F 1/28 |

* cited by examiner

WARP DETECTION AND CORRECTION IN TRAVELING MULTI-LAYER PRODUCT

CROSS-REFERENCE TO RELATED APPLICATIONS

This application is a continuation of U.S. patent application Ser. No. 19/079,917, filed Mar. 14, 2025, which claims the benefit of U.S. Provisional Patent Application Ser. No. 63/565,315 filed Mar. 14, 2024, the contents of which are incorporated herein in their entirety by reference.

FIELD OF THE INVENTION

The application relates generally to the production of a multi-layer product, and more particularly, to a manufacturing system that uses a shape measurement and defect detection apparatus during the production of the multi-layer product.

BACKGROUND OF THE INVENTION

The production of multi-layer products (e.g., corrugated board products) is well known. Briefly, in its simplest form a conventional corrugated board structure is made by gluing two flat sheets of web material (called 'liners') to the opposing flute crests of an intermediate, fluted or corrugated sheet of web material (called 'medium'). Often this is done by applying lines of glue, which can be an aqueous starch-based adhesive, to the flute crests of the corrugated sheet and then joining those glue-applied crests to the respective liner in a continuous process. First, a single-face construction is made by joining the first liner to the flute crests at one side of the corrugated sheet in a single-facer. Then the resulting single-face composite is delivered to a double-backer where the second liner is joined to the opposing flute crests to yield a three-layer corrugated board structure. The corrugated board structure is further cut by a rotary shear, transferred to a slitter scorer to perform slitting and creasing of the corrugated board, further cut to form pieces of corrugated board, and then the pieces are stacked. Such processes are well known, as described for example in U.S. Pat. No. 8,398,802, the contents of which are incorporated herein by reference.

The quality of the produced corrugated board product can be measured by determining flatness or the degree of warp. Whether a corrugated board product contains warp is dependent on many factors during the manufacturing process and subsequent storage. Factors can include, for example, paper supply, adhesive supply, machine tensioning and forces, moisture levels, heating steps, environmental and storage conditions. All of these variables affect the dimensional stability of the final board product on both the hygroexpansion and hydroexpansion levels.

Detection of warp is accomplished by systems that utilize cameras and lasers. The warp detection equipment is mounted well above cut or scored corrugated board product in a manufacturing system. Cut edges and scoring are detected by warp-detection systems and must be both tracked and accounted for when determining warp and what adjustments should be made to the manufacturing system. This adds complexity to the warp calculations. When mounted above the corrugated board product, the warp detection system cannot see the printed surface facing downward, so no quality assessments of the printing-side of the corrugated board can be achieved while measuring warp.

The corrugated board product also travels along conveyors and stationary surfaces during manufacturing and can be under tension and frictional forces from rollers and the stationary surfaces as the detection of warp is carried out. In addition to the tension and frictional forces that can pull a corrugated board product temporarily flat, the corrugated board product also tends to flatten under its own weight when not under tension as it travels on conveyors or is stacked at the end of a manufacturing process. Such additional forces, such as friction, tension and gravity, can alter the degree of warp that is detected and cause warp corrections to be imprecise. Friction, tension and gravity forces can hide warp that would otherwise be detectable and addressed by upstream adjustments to the manufacturing system. The undetected or hidden warp appears later downstream in the process and during storage of the corrugated board product and cannot be easily corrected post-manufacturing. This leads to waste and disposal of warped corrugated board product that increases the overall costs and time for producing quality corrugated board product.

The inventors have now discovered an efficient method for using a warp detection apparatus to analyze a corrugated board product during the process of manufacture under conditions that it is not exhibiting or significantly experiencing friction, tension, gravitational weight, or a combination thereof, thus making detection of and quantifying warp more accurate. Moreover, this analysis now correlates the measured warp during manufacturing to the true post-warp conformation of the manufactured board, after it has been stacked and had time to settle following the manufacturing process. The solutions disclosed herein facilitate measurements made during manufacturing, and adjustments based thereon, to more faithfully relate to true post-warp behavior of manufactured board, thus improving (i.e., minimizing) post-warp bending that tends to bring the finished board out of a flat conformation. The solutions also dispense with the drawbacks noted above that limit the position of warp detection equipment designed to be mounted above cut or scored corrugated board product. Not only are the current warp detection solutions complex by having to account for applied cuts and scoring, as well as attempting to compensate for other flattening forces, but they have exhibited problems with post-manufacturing outcomes of unwanted warped product.

BRIEF SUMMARY OF THE INVENTION

In accordance with one aspect, a method of correcting post-warp in a multi-layer product under prevailing conditions is provided. The method includes detecting an initial warp value of the multi-layer product indicative of an initial degree of warpage therein. The method further includes selecting from a database a moisture-conditioning setpoint from among a plurality of moisture-conditioning setpoints that have been correlated to respective initial warp values and their associated post-warp values for prior-made multi-layer products, said post-warp values being indicative of a degree of post-warp in the respective prior-made multi-layer products. Notably, the selection is based on a comparison between the detected initial warp value and the respective initial warp values in the database. Further, the method includes adjusting a moisture content in the multi-layer product according to the selected moisture-conditioning setpoint.

In accordance with another aspect, an apparatus for producing a multi-layer product is provided and includes a moisture conditioning apparatus for adjusting a moisture content in a layer of the multi-layer product prior to assembly of the multi-layer product, and a warp detection apparatus. The apparatus further includes a non-transitory computer-readable medium storing a database and a program. The program includes instructions, wherein the instructions, when executed by a processor of an electronic device, causes the electronic device to detect an initial warp value of the multi-layer product via the warp detection apparatus that is indicative of a degree of warpage therein under prevailing conditions. The instructions further causes the electronic device to select from the database a moisture-conditioning setpoint from among a plurality of moisture-conditioning setpoints that have been correlated to respective initial warp values and their associated post-warp values for prior-made multi-layer products, said post-warp values being indicative of a degree of post-warp in the respective prior-made multi-layer products, wherein said selection is based on a comparison between the detected initial warp value and the respective initial warp values in said database. Moreover, the instructions cause the electronic device to adjust the moisture content in the layer via the moisture conditioning apparatus according to the selected moisture-conditioning setpoint.

DESCRIPTION OF EXAMPLE EMBODIMENTS

As used herein, when a range such as 5-25 or >5 up to 25 is given, this means preferably at least or more than 5 or preferably >5, and separately and independently, preferably not more or less than 25.

It has been determined that by suspending or floating a multi-layer product (e.g., corrugated board product) on a cushion or stream of air that one or more forces that conventionally act on the corrugated board product to mask, hide or alter the degree of detectable warp can be significantly reduced and/or eliminated. For instance, the effect of tension and gravity forces on observable warp can be minimized or eliminated by the flotation of a corrugated board product. The flotation of a corrugated board product can be combined with a warp detection apparatus that is used to detect an amount (i.e., degree) of warp of the corrugated board product as it travels along and is temporarily floated in a portion of a corrugated manufacturing process. The warp detection apparatus can be selectively positioned to monitor one or more surfaces of the corrugated board product that is suspended on the cushion of air to assess the amount of warp without having to account for other forces that would otherwise mask, hide or alter the degree of detectable warp in the product.

Flotation of a corrugated board product in a corrugated manufacturing system is achieved by one or more flotation columns. A corrugated board product can be fed or transferred to move across an outer surface of the one or more flotation columns that have an opening or plurality of openings in the outer surface. An air source is used to supply a volumetric flow of air to the flotation columns which is then emitted from the outer surface of the flotation column through the openings to form a stream or cushion of pressurized air for supporting the corrugated board product traveling across the outer surface while floating on a cushion of air. Air, as used herein, can include any gas mixture and is not limited to a certain gaseous composition. The floating, air-supported corrugated board product can continue to travel and be exposed to a warp detection region that includes a warp detection apparatus for analyzing the floating product. The combination of the one or more flotation columns and warp detection apparatus can be positioned at one or more points along a corrugated manufacturing system. An example position is disclosed to briefly show how the combination can be utilized. The use of the combination is not limited to the example position or to only one location in a corrugated manufacturing system. Multiple combinations of flotation columns and warp detection apparatus can be used in a corrugated manufacturing system to closely monitor and analyze warp and for making adjustments in the manufacturing system to correct detected warp. To understand potential placement points for the combination, first a basic understanding of how paper webs are assembled will be helpful.

Figure 1:
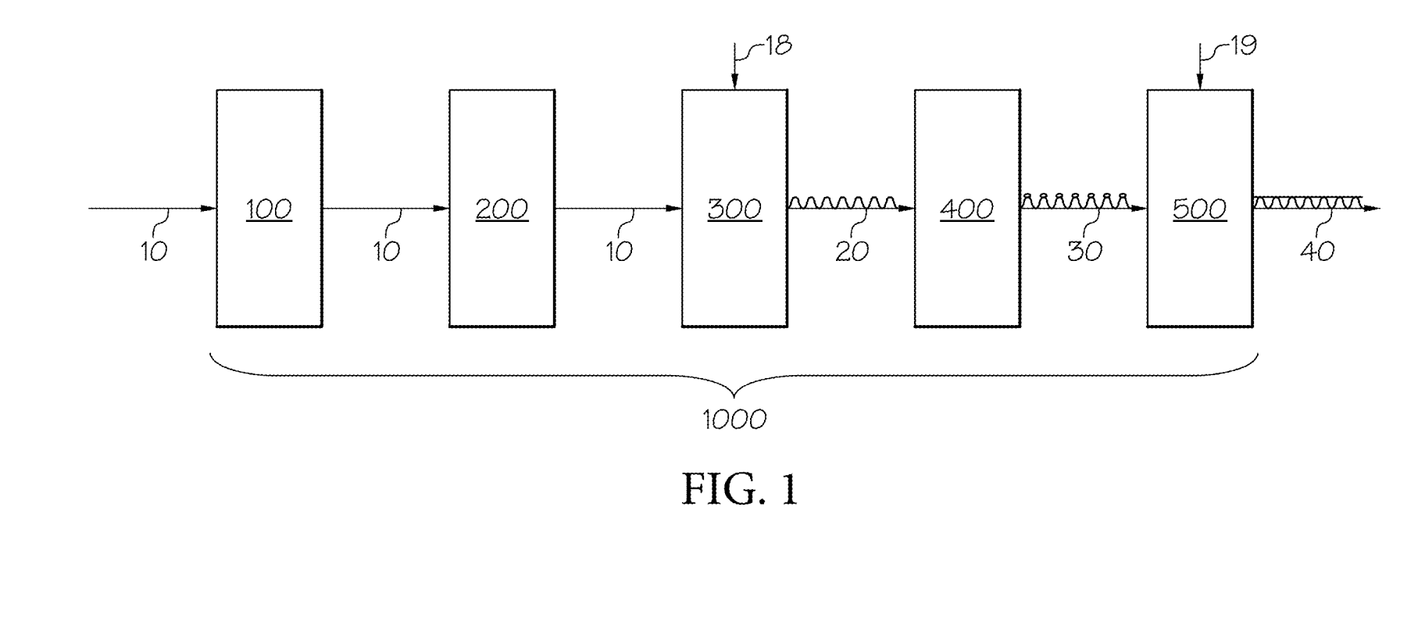
FIG. 1 is a top-level schematic block diagram illustrating example process steps and associated equipment for methods of making composite corrugated board.

An example corrugator setup will now be briefly described. A block diagram of an example corrugating apparatus 1000 is shown schematically in FIG. 1. In the illustrated embodiment, corrugating apparatus 1000 includes a moisture conditioning apparatus 100, a web heating arrangement 200, a single-facer 300, a glue machine 400, and a double-backer 500. These components (100-500) are arranged in the illustrated and recited order relative to the machine direction of a web of medium material 10 as it travels along a machine path through corrugating apparatus 1000 to produce a finished corrugated board product 40 exiting double-backer 500. As will become apparent, the medium material 10 will become the corrugated web to which the opposing first and second face-sheet webs 18 and 19 will be adhered to produce the finished corrugated board product 40. The corrugator setup described and illustrated here with respect to FIG. 1 is substantially the same as that described in detail in U.S. Pat. No. 8,398,802 incorporated by reference above. The same setup having similar and alternative features and as described in the '802 patent can be utilized in the methods disclosed herein. Specifically, the same moisture conditioning apparatus 100 (including a thin-film metering device 130) described in the '802 patent (where it is used to condition paper webs to 6-9 wt. % total moisture) can be used to apply the excess of moisture to the bonding surfaces of the medium and liners (and web if desired) as described herein.

The first face-sheet web 18 in FIG. 1 will supply the first liner for the finished corrugated board product 40 on exiting the corrugator. Prior to applying the first face-sheet web 18 to the corrugated medium material 10 as in the conventional process (e.g. disclosed in the '802 patent), it is conditioned to adjust its moisture content to achieve the combined effects described above of: protecting fiber-bound water to prevent over drying, reducing magnitude of hygroexpansivity, and stress-relieving the face-sheet web 18; all of which can be achieved via drying under restraint (i.e. under tension) against hot plates or heated rollers once the required excess-moisture layer has been applied.

The moisture adjustment can be achieved by applying a substantially continuous thin film of water to the first face-sheet 18 to adjust its overall moisture content to yield a substantial excess of moisture within the desired range as herein disclosed. The water layer can be applied to the side of the web 18 that will be down to (i.e., directly contact) a heat source prior to contacting flutes of the web of medium material 10, on which glue has been applied, for bonding thereto in the single-facer 300.

The resulting single-faced web 20 (composed of the web of medium material 10 adhered to the first-face sheet 18, preferably both of which by now have been moisture conditioned) exits the single-facer 300 and enters the glue machine 400 where glue is applied to the remaining exposed flute crests (as shown in the resulting single-faced web 30) in order that the second face-sheet web 19 can be applied and adhered thereto in the double-backer 500.

The single-faced web 30, having glue applied to the exposed flute crests, enters the double-backer 500 where the second face-sheet web 19 is applied and adhered to the exposed flute crests and the resulting double-faced corrugated assembly is pressed together.

Prior to entering the double-backer 500, the second face-sheet web 19, which will supply the second liner to the finished corrugated board product 40, is conditioned similarly as the first face-sheet web 18 described above to apply a metered thin film of moisture to achieve a substantial excess moisture content. Preferably this layer of moisture is applied to the bonding surface of the second face-sheet web 19, which will be bonded to the exposed flute crests of the web of medium material 10 via glue or suitable adhesive.

Figure 2:
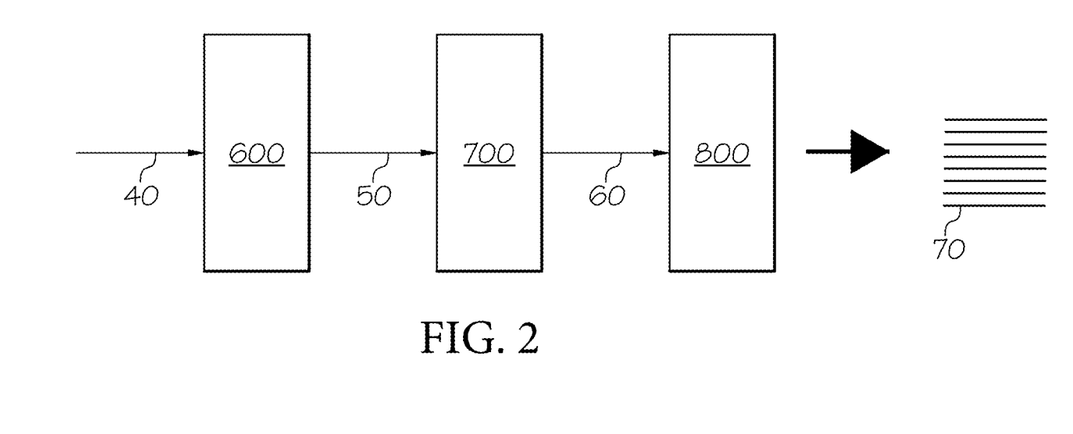
FIG. 2 is a top-level schematic block diagram illustrating example process steps and associated equipment for methods of making composite corrugated board.

The finished corrugated board product 40 can be further processed, for instance, as briefly shown in FIG. 2. Prior to downstream processing, finished corrugated board product 40 is a continuous formed sheet free of cuts, scoring and slits present in a stacked final product. Thus, finished corrugated board product 40 represents a product form, prior to downstream operations, that a warp detection apparatus can analyze without adjusting for product features that can appear as warp like scores, cuts, slits, etc. resulting from such downstream operations. Once finished corrugated board product 40 is further processed, warp detection can become more complex as various surface features and treatments must be appropriately accounted for to determine the accurate degree of warp in a corrugated board product.

From the double-backer 500, the corrugated board product 40 is transferred to a slitter scorer 600 to slit and/or score the finished corrugated board product 40 fabricated by the double-backer 500. The slit and/or scored corrugated board product 50 is moved through a cutter device 700 to produce individual corrugated product boards or sheets 60 at desired dimensions by cutting the corrugated board 50. The corrugated product boards or sheets 60 can be aggregated or shingled together and sequentially stacked by a stacker 800 to yield a stack 70 of individual corrugated board sheets 60. Notably, the spacing between the corrugated board sheets 60 in the stack 70 is for illustrative purposes only.

Figure 3:
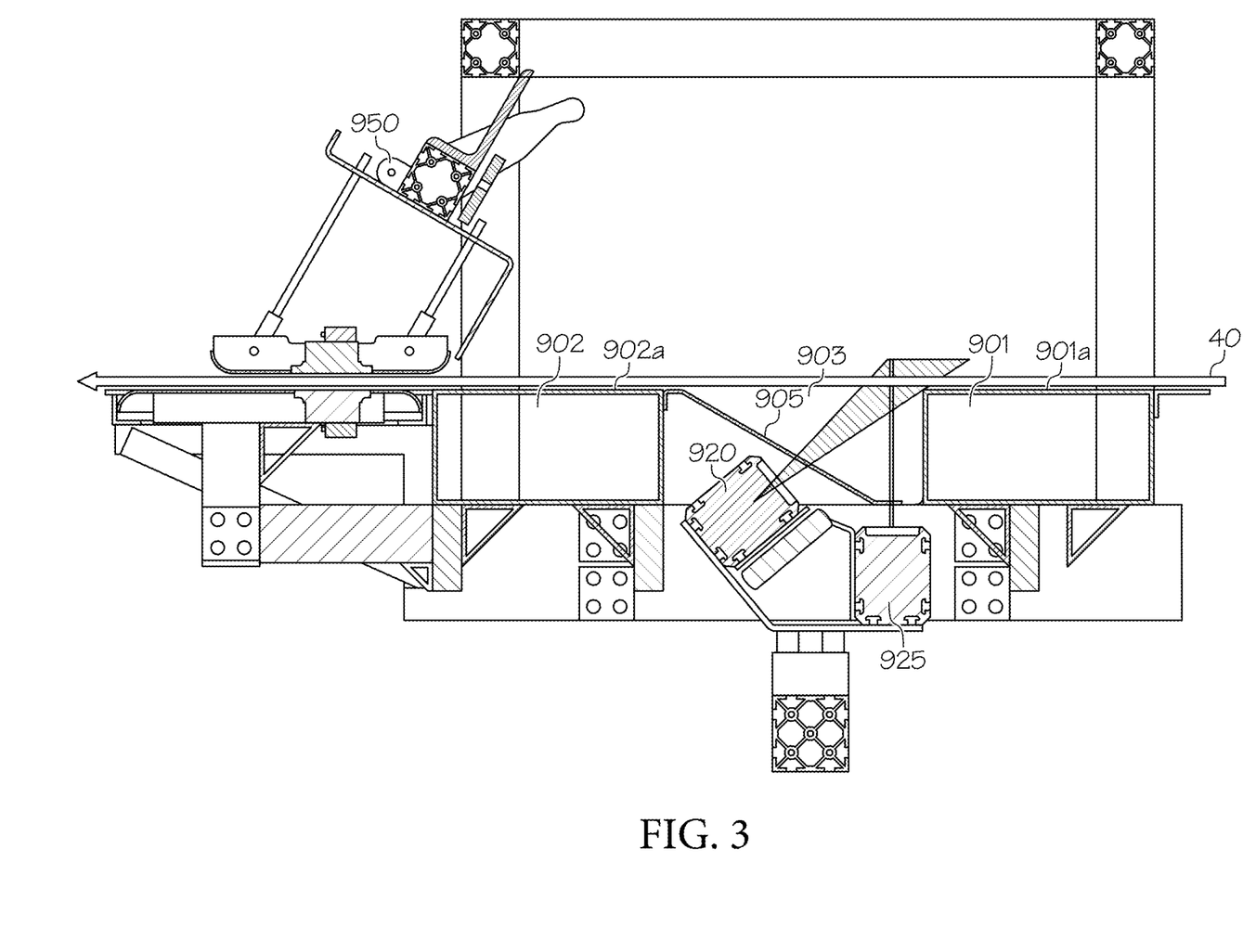
FIG. 3 is a side view of an example flotation column apparatus and warp detection apparatus that can be used in a corrugated board manufacturing system.

As noted above, the one or more flotation columns can be arranged at various points in the corrugated manufacturing system. FIG. 3 illustrates an example arrangement, in a cross-section view, of a first flotation column 901 spaced apart from a second flotation column 902. Flotation columns 901, 902 can be optionally secured together to provide structural integrity and ensure the columns are stationary, for example, by attaching a support bracket 905 to each column to prevent movement during operation. Flotation columns 901, 902 are shown as rectangular columns but any desirable column shape can be used such that an outer surface (e.g., flat plane) of the column is arranged to face corrugated board product 40 for supporting product 40 as it travels over and parallel to the outer surface of the one or more column(s) 901, 902.

As shown, corrugated product 40 is fed across the top outer surface 901*a* of flotation column 901 as indicated by the downstream travel direction arrow for product 40. Corrugated board product 40 travels across flotation column 901 and over an open area 903 before reaching the adjacent top outer surface 902*a* of flotation column 902. As shown, corrugated board product 40 is supported and suspended above the top outer surfaces 901*a*, 902*a* of flotation columns 901, 902, and likewise over open area 903 between the columns, on a stream or cushion of air emitted from the columns. The height of supported corrugated product 40 over the top outer surfaces 901*a*, 902*a* of columns 901, 902 can be varied, for example, in the range of 5 to 20 mm or any desired height, by adjusting air flow into and out of the columns. As will be further discussed below, the desired height of supported corrugated product 40 (over the top outer surfaces 901*a*, 902*a* of columns 901, 902) can be dependent on its grade. The grade of the product 40 can be determined based on its dimensions (e.g., width), the basis weight and/or material of the individual medium material 10, and of the first and second face-sheet webs 18, 19, average height of the flutes, flute count per predetermined length, etc. Corrugated board product 40 travels over both columns 901, 902 and open area 903 without contacting another solid surface thereby reducing additional forces (e.g., friction) that can act on and/or alter detectable warp in the product in the vicinity of the open area 903. The top outer surfaces of the columns can be described as zero-contact surfaces since the corrugated board product is supported directly above and not in contact with such surfaces. It is not meant to imply that there can never be any contact between any flotation column surface and the corrugated board product. Contact may occur, for example, due to transient or momentary fluctuations during operation.

Figure 4:
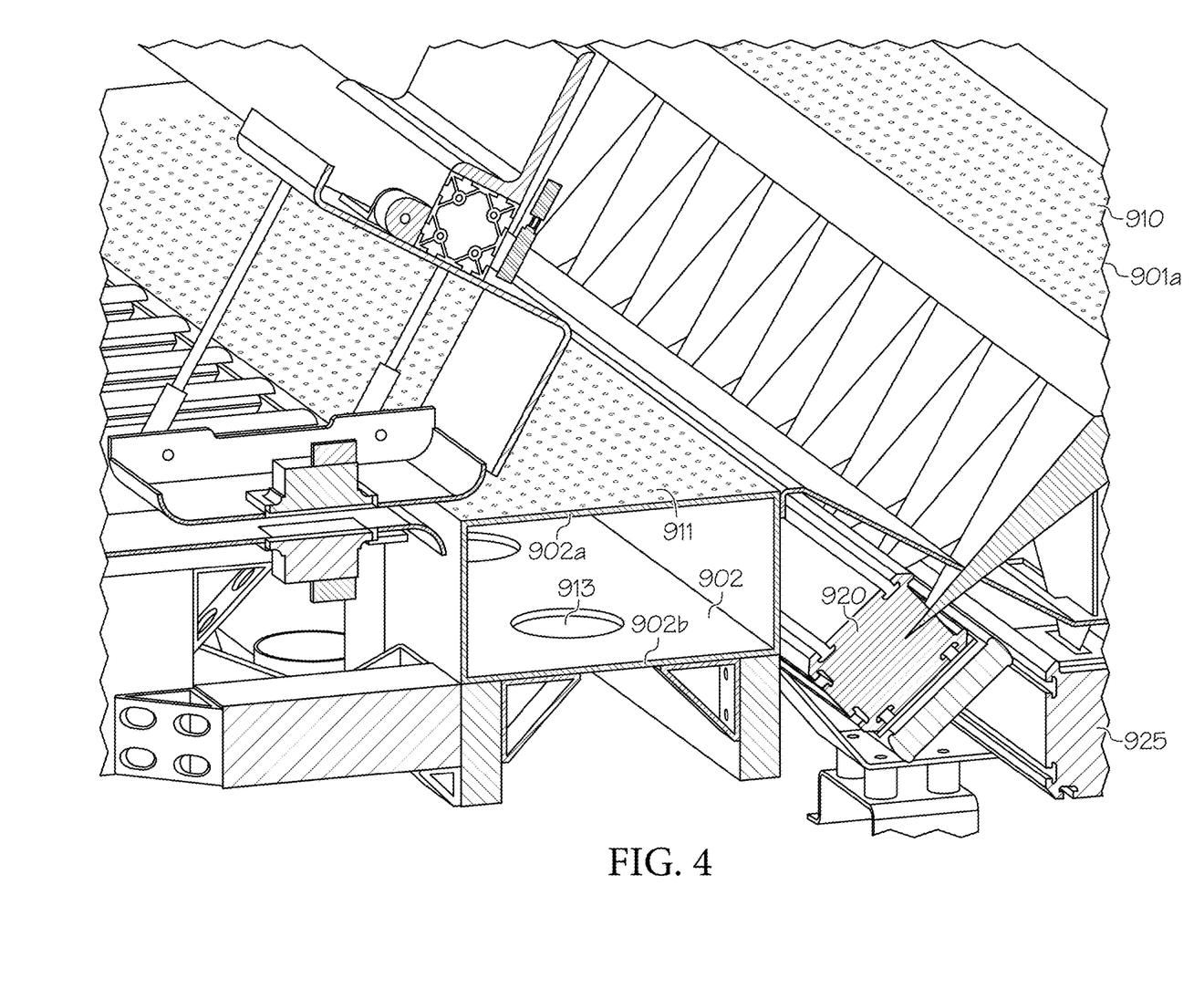
FIG. 4 is a perspective view of a portion of the flotation column apparatus and warp detection apparatus of FIG. 3.
Figure 5:
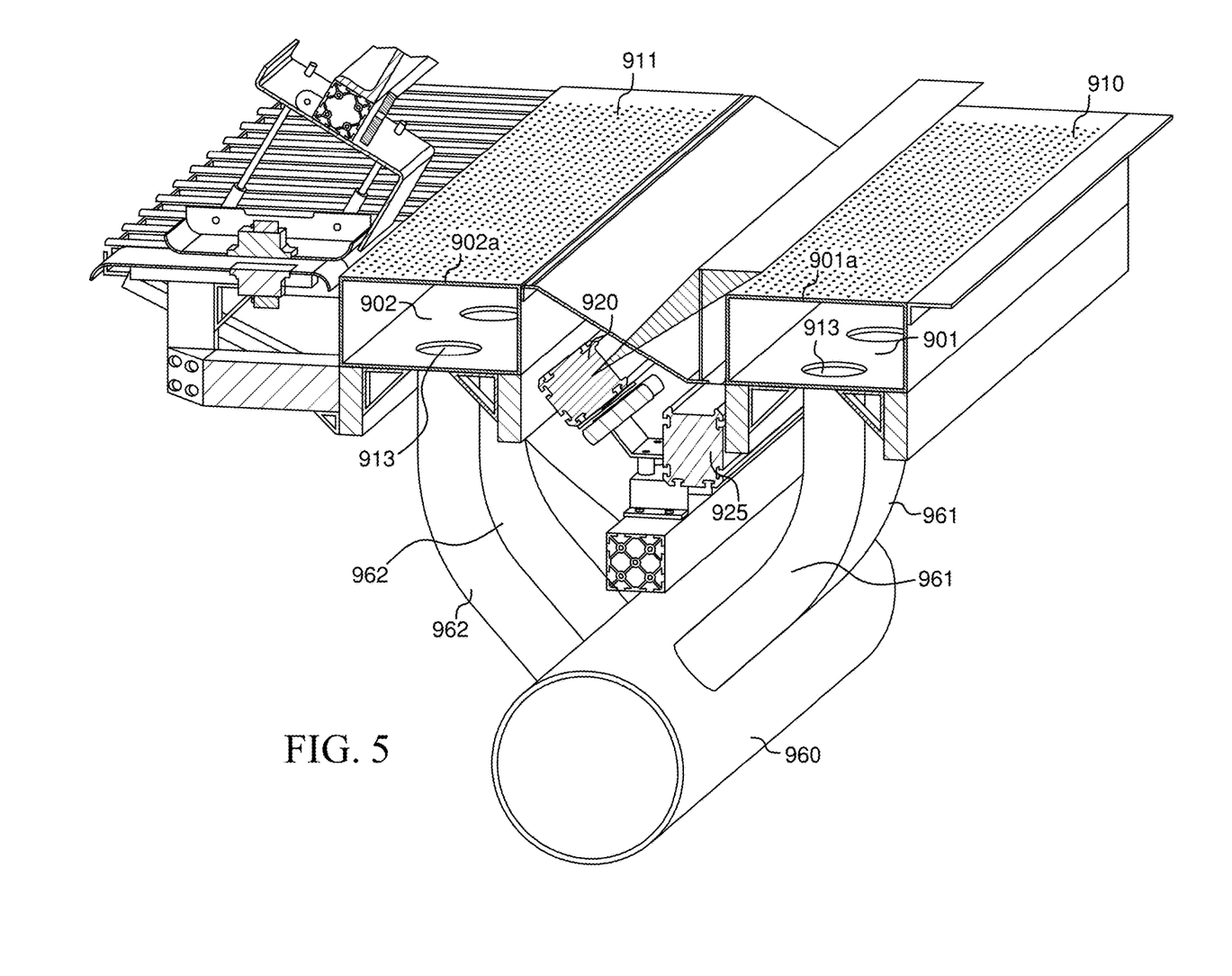
FIG. 5 is a cross-section view of a portion of the flotation column apparatus and warp detection apparatus of FIG. 3.

To support corrugated board product 40, columns 901, 902 are hollow for receiving a flow of air from a pressurized air source. FIG. 4 illustrates flotation column 902 having a hollow center portion with multiple openings 913 along the bottom outer surface 902*b* for receiving a volumetric flow of air from a pressurized air source. Columns 901, 902 can alternatively receive pressurized air from a single inlet into the column positioned at any suitable location (e.g., a bottom outer surface or column end surface). Air flows into flotation column 902 and is emitted out of the column through openings 911 in outer surface 902*a* of column 902. The volume or flowrate of pressurized air being fed to flotation column 902 can be varied depending on the desired flotation or support height of corrugated board product 40 above outer surface 902*a*. An air source preferably supplies compressed or pressurized air to columns 901, 902 and the pressurized air can be transferred to the columns as known in the art, for instance, by an air handling unit, pump, compressor or transfer blower. FIG. 5 shows an example air flow system for providing pressurized air to the flotation columns. A primary supply header 960 can be in fluid connection with a pressurized air supply. Primary supply header 960 is arranged to position a volumetric flow of pressurized air in proximity to flotation columns 901, 902. Header 960 can have one or more supply channels 961, 962 extending outward from the primary supply header to route or direct the pressurized air to inlet openings 913 to fill columns 901, 902 with pressurized air for floating product 40 on a constant stream of emitted air.

The top outer surfaces 901a, 902a of flotation columns 901, 902 can include one or more openings 910, 911 such as a plurality of openings for emitting air from inside the columns to form a cushion of flowing pressurized air above surfaces 901a, 902a. Openings 910, 911 can be arranged along the top outer surfaces to cover the entire area that corrugated board product 40 will travel over those openings in the top outer surfaces. For example, corrugated board product traveling through a manufacturing system can have a width in the range of 2 to 3.5 meters and thus the flotation columns can include openings that span substantially all or the entire width of the traveling corrugated board product to ensure it is sufficiently supported on a cushion of air. As shown, a plurality of small openings 910, 911 are uniformly arranged in an array on the top outer surfaces 901a, 902a of the columns, although any pattern and size of openings can be used. Any number of openings can be used to support corrugated product 40 wherein the number of openings and air flowrate through the openings can be adjusted to achieve flotation of corrugated board product 40 above the top outer surfaces.

The flotation columns can be used with a warp detection apparatus. The warp detection apparatus is able to detect a degree of warp of a surface, for instance, whether the corrugated board product (e.g., continuous corrugated product, corrugated sheets in the cut, slit and/or scored form) are at least partially warped or non-warped along the length and/or width thereof as it travels on a cushion of air formed by the flotation columns. The warp detection apparatus components are known in the industry.

It is preferred that the warp detection apparatus is positioned at a distance away from the corrugated board product such that the warp detection apparatus is not in direct contact with the product. The warp detection apparatus detects and measures the distance from and/or profile of the air-suspended and traveling corrugated board product, preferably across the entire width and/or length thereof. In one example, the warp detection apparatus can be configured to include a laser distance detection or line profile detection device 925.

In another example, the warp detection apparatus can include an imaging device, either alone or in combination with a laser as shown in FIGS. 3-5. To detect the amount of surface variation or warp in a corrugated board product the apparatus can include an imaging device for performing a scan of the product surface to provide imaging data so that image analysis can be carried out to analyze surface variation amounts based on collected imaging data from the imaging device. For instance, the imaging device can be a camera. Once an amount of surface variation is determined relative to the travel direction of the corrugated board product, the amount of warp can be calculated in said direction. The calculated amount of warp enables correction adjustments to be executed upstream, downstream, or a combination of both relative to the warp detection apparatus in the corrugated manufacturing system to prevent or reduce a degree of warp in future corrugated board product as compared to the analyzed product. Corrective warp measures or adjustments can be carried out by an operator. The warp detection apparatus can communicate with an information processing device or system that can change or correct one or more variables in the corrugated manufacturing system. Such variables can include, but are not limited to, a preheating or heating temperature of a roller, a face sheet, a web of material or corrugated product, a steam supply or temperature thereof, a water film amount applied to a face sheet or surface of a corrugated product, a glue amount, and the like.

Further measurements of surface and property data about the corrugated board product can be made at or near the point of warp detection by the warp detection apparatus. For example, a moisture sensor can be mounted directly upstream or downstream of the warp detection apparatus to convey the present moisture content of one or more layers of the corrugated board product in real time during manufacturing. The moisture data of the corrugated board product can be used to give an operator additional data for making warp adjustments to a corrugated product or individual component or surface thereof. As shown in FIG. 3, a moisture sensor 950 is positioned directly downstream of warp detection apparatus 920, 925 to determine moisture content of the layers of corrugated board product 40. The measured moisture content will further assist an operator in determining, if applicable, the amount of moisture to apply to the corrugated board product or to a specific layer or surface of the product.

FIG. 3 illustrates an example arrangement of a warp detection apparatus relative to a traveling corrugated board product 40 supported on a cushion of air provided by flotation columns. As shown, camera 920 and laser 925 are mounted below the supported corrugated board product to analyze the bottom surface of the product facing the flotation columns. In an example arrangement, camera 920 and laser 925 are positioned in between spaced-apart flotation columns 901, 902. Depending on the distance or open height between the top surface of flotation columns 901, 902 and a first surface of corrugated board product 40 facing columns 901, 902, there may not be sufficient space to position components of the warp detection apparatus over the top surface of the columns. Rather, the open space 903 between columns 901, 902 forms a warp detection zone in which the warp detection apparatus components can evaluate the surface of floating or air-suspended corrugated board product 40 facing downward, for example, a bottom outer surface having printed indicia. The warp detection apparatus components 920, 925 can be mounted at any suitable distance from corrugated board product 40. The shown arrangement provides components 920, 925 to be mounted close to product 40 and can improve the accuracy of warp detection. In one example, the warp detection apparatus is mounted less than 1 meter, less than 0.5 meters, less than 0.2 meters or less than 0.1 meters from an outer surface of corrugated board product 40. In another example, the warp detection apparatus is mounted relative to the corrugated board product such that it is capable of detecting warp or surface variations in the corrugated board product of 100 µm or less, 50 µm or less, or 25 µm or less.

The warp detection apparatus components 920, 925 can be mounted on or around support bracket 905, or any alternative suitable support surface including a side surface of one or both of columns 901, 902. One or more openings or slots can be provided in support bracket 905 to accommodate camera views or lasers being generated below bracket 905 by components for targeting surfaces of corrugated board product 40. For example, FIG. 4 shows multiple through openings in support bracket 905 to permit camera 920 views and laser contact of the bottom surface of corrugated board product 40.

Although not shown, a warp detection apparatus can be mounted above the corrugated board product supported by emitted pressurized air from a flotation column (e.g., flotation columns 901, 902). Being mounted above supported corrugated board product 40, a warp detection apparatus need not be arranged between flotation columns 901, 902, but rather can be mounted over one of the columns or in any other suitable arrangement that can also include areas upstream and downstream of the columns and areas between the columns. In other examples, two or more warp detection apparatuses can be used to detect warp in a supported corrugated board product. A warp detection apparatus can be mounted above the supported corrugated board product supported by a flotation column while a separate warp detection apparatus can be mounted below the same corrugated board product as depicted in FIG. 3.

The one or more warp detection apparatuses can be positioned, along with the one or more flotation columns, at any point in a corrugated manufacturing system for determining the amount of warp in a corrugated board product. In one example, a warp detection apparatus is positioned upstream of a slitter, scorer or cutter and works in conjunction with one or more flotation columns to analyze warp of a corrugated board product supported on a cushion of air. The warp detection apparatus can also be positioned downstream of a double-backer as described in FIG. 1. In yet another example, one or more warp detection apparatuses can be positioned, either below, above or both relative to a corrugated board product, between a double-backer and a slitter or scorer.

Figure 6:
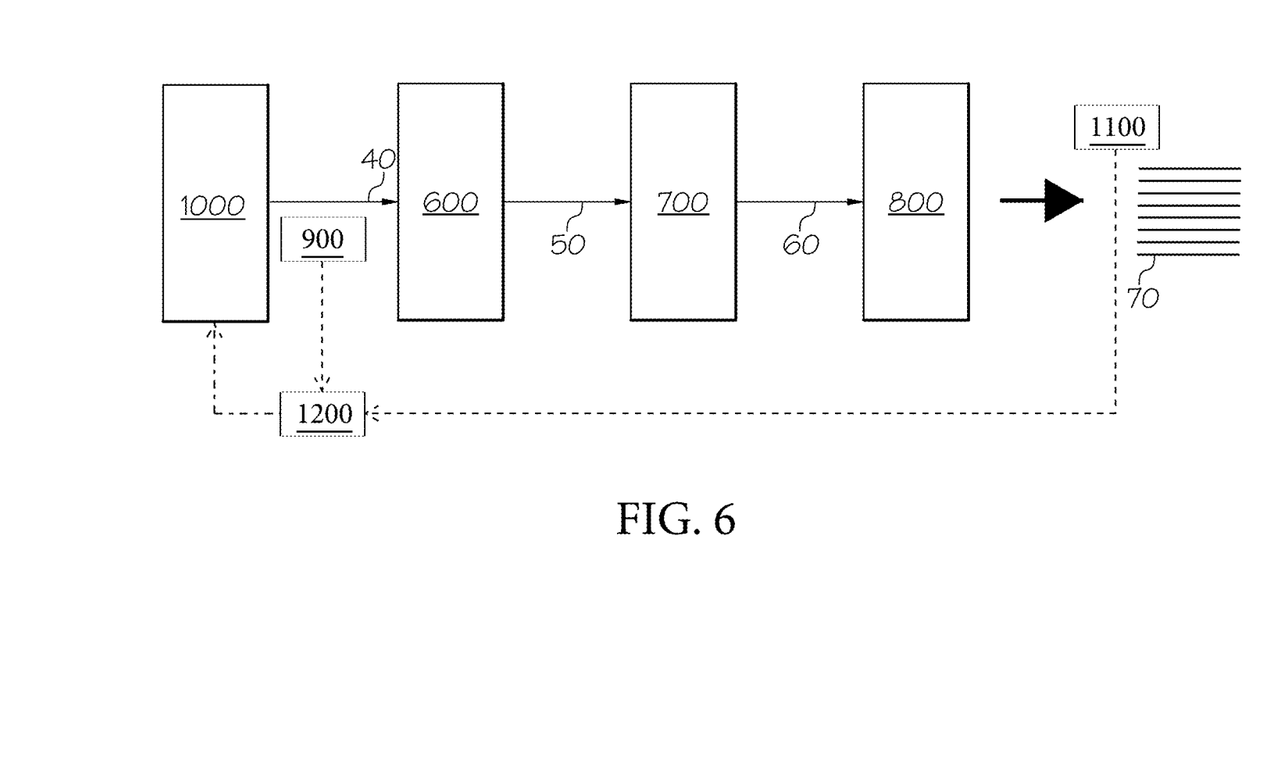
FIG. 6 is a top-level schematic block diagram illustrating an example process for determining warp in a corrugated board.

A method of using the apparatus as described above, for determining a degree of warpage in a multi-layer product (e.g., corrugated board product) and correcting post-warp in the multi-layer product, will now be described. FIG. 6 features a schematic representation of select portions of a multi-layer manufacturing system (e.g., corrugating board manufacturing apparatus), beginning with a corrugating apparatus 1000. The corrugating apparatus 1000 assembles a composite corrugated product, e.g., from two opposing liners and an intermediate medium material as known in the art, and can include the machine units 100-500 shown in FIG. 1 and discussed above.

The depicted corrugated manufacturing system includes a flotation and detection apparatus 900 in between the corrugating apparatus 1000 and the slitter scorer 600 in the travel direction. For example, the flotation and detection apparatus 900 can be disposed directly in between a double-backer of the corrugating apparatus 1000 and the slitter scorer 600. The flotation and detection apparatus 900 can be or include the warp detection apparatus and flotation columns described above and depicted in FIGS. 3-5. Further, a post-warp detector 1100 can be provided downstream of the stacker 800 to determine an amount of post-warp in corrugated product sheets supplied in a stack 70 by the stacker 800. In one example, the post-warp detector 1100 is similar to the detection device described above (e.g., an imaging device such as a camera and/or a laser device). Alternatively, post-warp may be detected by an operator (e.g., through visual inspection, etc.).

As used herein, the term post-warp refers to the amount of increased or decreased warpage (i.e., the degree of change in measurable warp) of a corrugated product that is observable over a predetermined amount of time following an initial measurement or detection of warp in such product. Ideally post-warp is measured after the corrugated sheet has been cut and stacked in a stack 70 following the corrugating process. Preferably, post-warp is measured at least 30 seconds following the initial warp measurement, preferably, at least 60 seconds thereafter, and more preferably at least 90 seconds thereafter. Post-warp can be measured, e.g., 30-180 seconds after the initial warp measurement has been made. For corrugating systems that use a conventional Kohler waterdeck to moisture-condition the papers, typically post-warp equilibration would be expected within 30 minutes after elution from the corrugator. In another example, for corrugating systems that employ conventional water-spray technology to adjust moisture content, the imprecision of such water spray can mean that full equilibration may not occur until up to 4 or 6 hours after exiting the corrugator.

The corrugated manufacturing system depicted in FIG. 6 further includes a controller 1200 that receives data inputs from the flotation and detection apparatus 900 as well as the post-warp detector 1100. Using these data inputs, the controller 1200 controls and adjusts the application of moisture to one or more of the components used to manufacture corrugated board (e.g., to first and second opposing liners and/or to the intermediate medium material) in order to adjust the degree of warp in such board as measured by the detection apparatus 900. The controller 1200 can be any non-transitory computer-readable medium storing at least one dataset (e.g., in a database) and one or more programs comprising instructions that, when executed by one or more processors of an electronic device (or the like), implement moisture adjustments in accordance with said instructions. For example, the controller 1200 can be or include a processor (or microprocessor) and memory such that the processor can store datasets in computer-readable memory (e.g., embedded in the processor) and execute computer-executable instructions stored in the computer-readable memory for implementing the moisture adjustments.

As will be further discussed below, the controller 1200 can be programmed with or query a database (e.g., which stores a plurality of datasets in memory) that correlates initial warp values of prior-made multi-layer products (e.g., previously manufactured corrugated products) measured by the flotation and detection apparatus 900 with post-warp values of those prior-made products measured by the post-warp detector 1100, as well as their respective prevailing conditions under which those products were made. More specifically, each dataset can include an initial warp value, a post-warp value, at least one prevailing condition, and a moisture conditioning setpoint that yielded the associated post-warp value in conjunction with the remaining elements in the dataset with respect to a prior production run for a previously made corrugated board product. Prevailing conditions that may be incorporated into the datasets include ambient temperature, pressure, and/or relative humidity of or at the location of the manufacturing facility, as well as parameters specific to the corrugating feedstock materials such as their source, quality, thickness, basis weight, moisture content, and/or composition. Prevailing conditions also can include processing or operational parameters, such as the date and/or time of production, the speed at which the multi-layer product is being manufactured (i.e. line speed), chemical composition of the aqueous starch-based adhesive and/or the amount of the adhesive applied to the flute crests. The moisture conditioning setpoint in a particular dataset generally will relate to a single face sheet in the prior-made product. For a single-wall prior-made product, there will be two datasets: one for each of the opposing outer face sheets, such that the associated datasets will be correlated together as relating to single, single-wall product that resulted in their corresponding shared post-warp value under the shared prevailing conditions. In the case of a single-wall product it generally will be appropriate that the controller 1200 operate a particular corrugating apparatus according to a plurality of moisture-conditioning setpoints, each specific to one of a plurality of face-sheet webs being used to manufacture the corrugated product, wherein the respective moisture-conditioning setpoints are derived and selected in coordination with one another from correlated datasets in order that they may cooperate to yield a corrugated product that has been optimized to minimize post-warp. Each such moisture-conditioning setpoint among a group of correlated datasets for a particular prior-made corrugated product relates to the degree or amount of moisture applied to one of the separate layers of the multi-layer product via a respective moisture applicator in its manufacturing process.

To ensure as much as possible that final manufactured board (stacked in sheets 70) will be flat, the controller 1200 can independently control the moisture application for each layer of the multi-layer product upstream (i.e., in the corrugating apparatus 1000) based on initial warp values measured by flotation and detection apparatus 900, wherein the controller 1200 will target warp values at the flotation and detection apparatus 900 that correlate to flat-board post-warp values in the aforementioned database. In this manner, the controller 1200 is able to exercise predictive control to determine appropriate conditioning setpoints (e.g., moisture-conditioning setpoints) associated with historical correlations between initial- and post-warp measurements of prior-made products based on prevailing conditions under which those products were manufactured. The (historical) prevailing conditions (i.e., as listed above) can be tabulated in the database against measured correlations between initial- and post-warp values of prior made products where post-warp was essentially zero or within an applicable tolerance range of zero; that is, essentially flat board. Moreover, in addition to querying the database, the controller 1200 also can record additional, new correlations in the database that will be integrated therein and associated with prevailing conditions; thereby expanding the database. In this manner, the database essentially grows as time goes on and additional warp-correlations are entered between initial- and post-warp measurements associated with their respective prevailing and manufacturing conditions, so that the predictive ability of the controller 1200 querying the database improves as that database grows to include more correlations and their associated conditions.

In one example, the controller 1200 references this database to select and apply the appropriate moisture conditioning setpoints to the corresponding conditioning apparatus (e.g., corresponding moisture applicator) in the corrugating apparatus 1000 to correct warp in the corrugated board product 40 in real time. This selection and application of an appropriate moisture conditioning setpoint is based on a comparison between the initial warp value detected by the flotation and detection apparatus 900 and the previously detected initial warp values stored in the database. Specifically, the controller 1200 compares the detected initial warp value (and the prevailing conditions under which it is currently being made) to the plurality of stored initial warp values for prior made products (as well as their respective prevailing conditions under which they were made) and identifies the stored dataset (i.e., stored initial warp value of a prior-made product and the prevailing conditions under which it was made) that is numerically closest thereto, preferably taking account of all the data entries in the dataset- and which is correlated to a post-warp value indicative of flat board, and/or having a degree of warpage within an acceptable tolerance range. Of note, the prevailing conditions associated with the multi-layer product currently being made may be sensed via various sensors (e.g., temperature sensors, moisture sensors, humidity sensors, etc.), or they may be observed by an operator and manually entered via an input device to be correlated with the associated data. At least some prevailing conditions generally will be manually input into the controller (e.g., the paper grade, basis weight, starting moisture content, etc.). Once a stored dataset most-nearly corresponding to the parameters of the current manufacturing process is identified, the controller 1200 adjusts the moisture conditioning setpoint(s) for the multi-layer product currently being produced to that/those correlated to the identified dataset (i.e., the moisture conditioning setpoint under which that particular multi-layer product was previously made). Optionally, as in the case where a plurality of datasets in the database may be equally or comparably close to the constellation of parameters of the board to be presently manufactured, instead of simply selecting one of the datasets from which to derive moisture-conditioning setpoints, the controller 1200 may perform a multivariate analysis between the historical datasets stored in the database in view of the detected initial warp value (along with its prevailing conditions) to determine an optimized moisture conditioning setpoint. In this manner, despite that an ideal moisture-conditioning setpoint(s) may not be available in the database (because there are no exact-match datasets to the present conditions for the board to be manufactured that yielded acceptable post-warp), it still will be possible to identify a moisture conditioning setpoint (or setpoints for the respective layers of the board) that will result in a finished multi-layer product (stacked in sheets) that is flat, or within an acceptable tolerance range, As noted above, the moisture conditioning setpoints for different layers within a given multi-layer corrugated product may be included in respective but correlated datasets in relation to the prior-made board product from which they were derived. Alternatively, the respective setpoints for the various layers within a multilayer product may be stored together in the same dataset wherein each such setpoint itself is associated with a particular one of the layers in that dataset, together with other prevailing-condition parameters in the dataset. Either way, the controller 1200 can independently control the moisture applicators for each layer in a manufacturing process for making a multilayer corrugated product to adjust the moisture content in each respective liner, independently of the other layers thereof. Because the moisture content of each such layer can be independently controlled, the controller is able to increase or reduce the moisture-application to only one or both of the opposing face-sheets of a single-wall product (for example) depending on whether or which one may have a moisture content that is too high or too low relative to the other, so that their competing warpage tendencies based on their respective moisture-conditioning setpoints will tend to cancel out one another to arrive at warp-free, or substantially warp-free board.

In some implementations, the controller 1200 can utilize one or more artificial intelligence (AI) or machine learning (ML) models and/or algorithms trained on input values (e.g. initial warp values, prevailing conditions, etc.) correlated with post-warp values (e.g. stored in the database). Utilizing the one or more AI models and/or algorithms, the controller 1200 can predict a post-warp value based on a detected initial warp value and/or prevailing conditions. Still further, the controller 1200 can utilize the one or more AI models and/or algorithms to determine the moisture conditioning setpoint, for example, based on the detected initial value, prevailing conditions, and/or a desired post-warp value. For instance, the AI models and/or algorithms can be additionally trained on previously performed corrective actions as described above, to autonomously adjust a moisture conditioning setpoint for a multi-layer product being produced.

Figure 7:
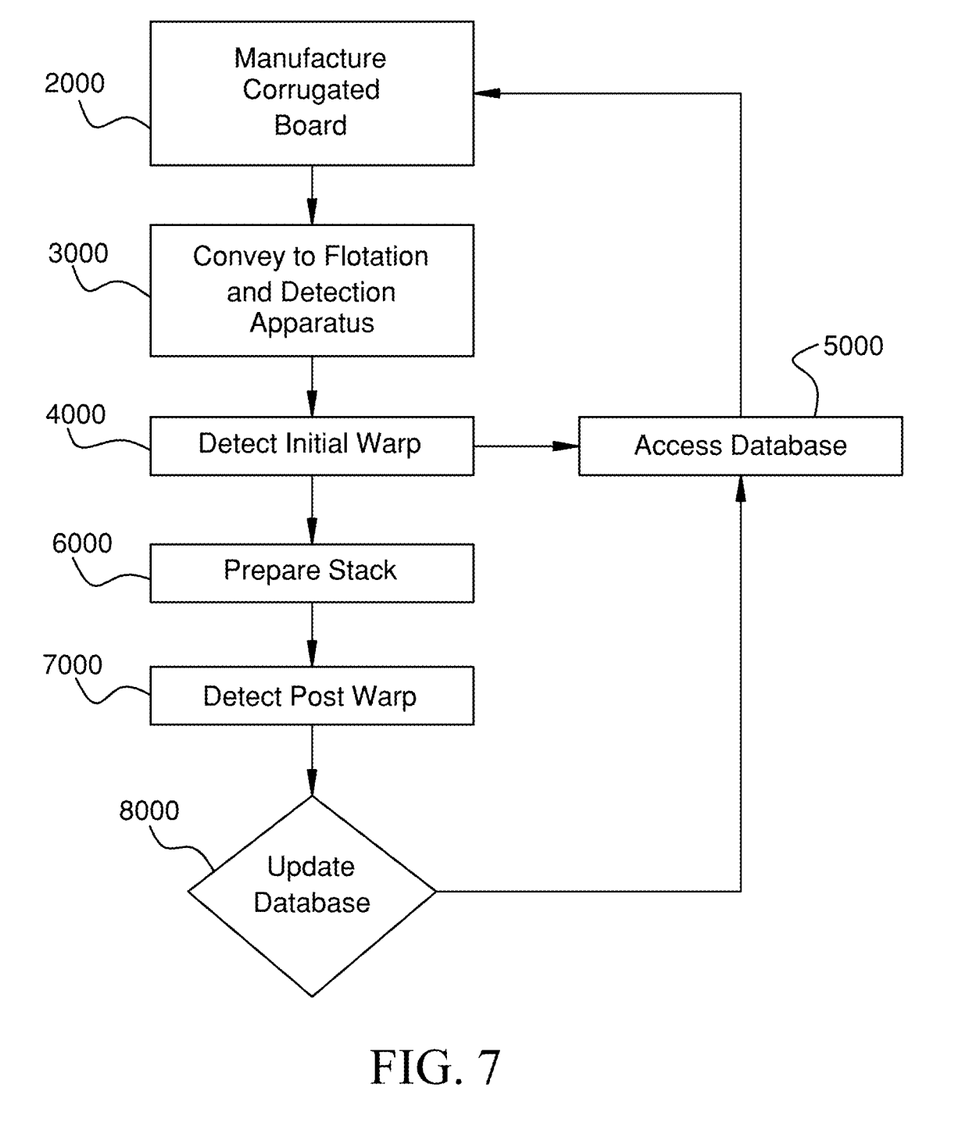
FIG. 7 is a flowchart diagram depicting a process for correcting post-warp in a corrugated board.

The example method will now be described in relation to the process flowchart diagram depicted in FIG. 7. In an initial step 2000, a corrugated board product 40 is prepared and conveyed (in step 3000) to the flotation and detection apparatus 900 in a continuous traveling web; prior to any slitting, scoring or cutting of that web. The corrugated board product 40 can be prepared in substantially the same manner as described above in relation to FIG. 1, including conditioning first and second liners and a medium material (e.g., corrugated web), and subsequently attaching (e.g., gluing) said first and second liners to the opposite flute crests of the medium material. Of note, the corrugated board product 40 can be conveyed to the flotation and detection apparatus 900 directly from the double-backer 500. Alternatively, there may be intervening process steps.

Subsequently, in step 4000, the corrugated board product 40 traverses the open area 903 above the flotation columns 901, 902 in order that an initial warp value of the corrugated board product 40 can be detected via the warp detection apparatus 920, 925. This initial warp value can be detected at least 500 milliseconds after having exited the corrugating apparatus 1000. As mentioned above, the corrugated board product 40 is suspended above the flotation columns 901, 902 at a fixed height, preferably dependent on its grade. By employing a fixed height of suspension, a base-line warp value or range of warp values can be determined that is specific to the particular grade of the corrugated board product 40, which can be referenced and selected upon initial set-up during subsequent manufacturing runs, as further discussed below.

Figure 8:
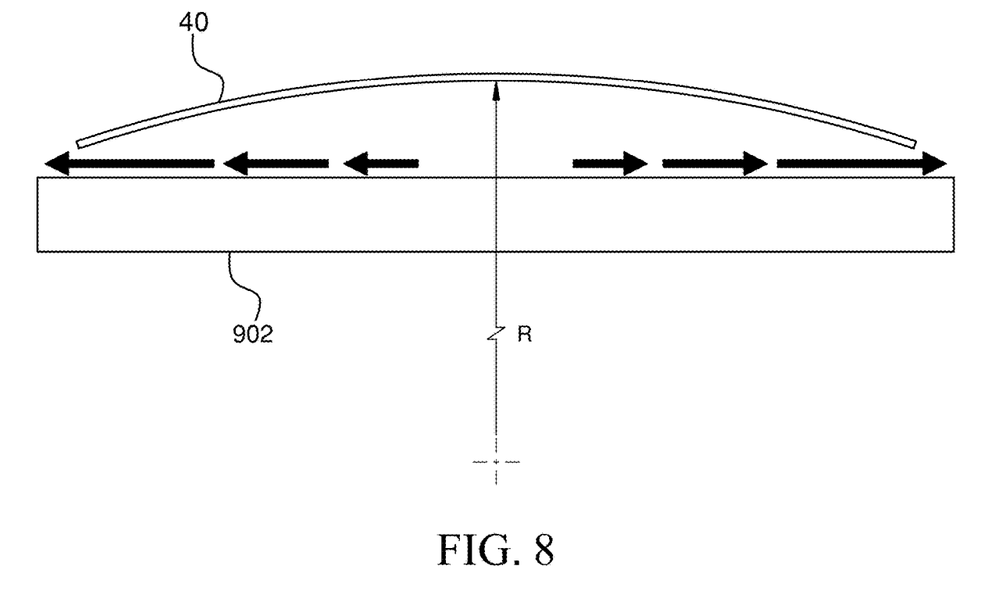
FIG. 8 is a schematic, cross-section view of a corrugated board product as it passes through a flotation column apparatus as described in a board-manufacturing process.

With reference to FIG. 8, a schematic cross-section of the suspended corrugated board product 40 is shown as it travels in the vicinity of the open area 903, wherein the travel direction is into the page. As shown, the cushion of air suspends the corrugated board product 40 to provide non-contact travel over the flotation columns (and across the open area 903, shown in FIG. 3). Notably, the cushion of air reduces a radius of curvature 'R' in the corrugated board product 40, thereby increasing or enhancing the arc of curvature (i.e., degree of warpage) of the corrugated board product 40 at least in the cross-machine (i.e., cross-travel) direction as it is suspended.

This enhanced curvature results from multiple factors. For example, the bottom liner (e.g., the initial liner that yields the single-face construction) is typically dryer than the top liner (e.g., the liner provided by the double-backer 500). This is because the initial (bottom) liner has been dragged against heated surfaces for longer, and also will have been applied prior to the subsequent (top) liner, resulting in it having had more time to lose moisture. As a result, the bottom liner typically will have undergone a greater degree of warpage associated with drying than the top liner at the point where the corrugated board product 40 reaches the open area 903. Accordingly, the difference in moisture between the opposing liners yields a differential tension between them that induces a bow in the cross-machine direction (i.e., cross-sectional profile) of the corrugated board product 40, wherein its lateral edges point downwards, or towards the flotation column(s).

Additionally, the region of the corrugating machinery in the vicinity of the flotation columns 901, 902 (depicted in FIG. 4) is configured so that air eluted from openings 910, 911 is expelled predominantly perpendicular to the travel direction of the corrugated board product 40; i.e., along a cross-machine direction so that air is expelled essentially from underneath the lateral edges of the web of corrugated board product 40, laterally outward. Because the traveling web is effectively concave opening downward, with the lateral edges nearest to the subjacent columns 901, 902, the velocity of air adjacent to those edges is of greater magnitude than near the center (graphically represented via the respective sizes of the arrows in FIG. 8). The increasing velocity of air through a decreased-size space adjacent to the web edges induces a Venturi effect as air is expelled laterally adjacent to the lateral edges of the traveling web of corrugated board product 40. This effect reinforces and amplifies the downward force (and thus the downward bending) of that web at its lateral edges. And while the pressure is reduced and velocity increased at the edges, the opposite is true (i.e., pressure is relatively higher but at lower air velocity) toward the center of the web of corrugated board product 40. These cooperating effects (i.e., reduced pressure at the edges, higher pressure toward the center) tend to reduce the radius of curvature of the corrugated board product, which amplifies its arc of curvature or warpage compared to the otherwise natural warpage of the web of corrugated board product 40 in the vicinity of the open area 903 where warpage is measured.

Indeed, the amplified curvature will be more readily detectable compared to the natural degree of warpage without the aforementioned enhancement. As a result, the initial warp detection of the corrugated board product 40 (via the warp detection apparatus 920, 925) can be made at a higher resolution than would be possible in the absence of the enhancement; because a greater magnitude warpage or bending detected by the warp detection apparatus 920, 925 ultimately will equate to the same degree of post-warp downstream as without the measured enhancement once the external forces that tend to enhance the warpage magnitude are removed. In a preferred embodiment, the initial warp detection is made by measuring warpage along the entire (underside) profile of the corrugated board product 40, as well as the distance from one lateral edge to the other, across the entire width of the corrugated board product 40.

With reference to step 5000 in the present method, the value of initial warp detection for the corrugated board product 40 is correlated to a final post-warp value of prior-made corrugated board products (e.g., via the database discussed above and further below) in order that operating parameters of the corrugating apparatus 1000 (notably relating to the application of moisture to one or both of the liners, as well as to the medium material upstream) can be adjusted based on the correlated post-warp value of the prior-made product, but using feedback control based on the initial warp-detection measurement at the flotation and detection apparatus 900 of the corrugated board product under prevailing conditions. In other words, the controller 1200 references the database and selects appropriate moisture setpoint levels of the corresponding moisture applicators in the corrugating apparatus 1000 (based on historical entries) to adjust the warpage of the corrugated board product measured at the flotation and detection apparatus 900 in real time. Notably, it is to be understood that a post-warp value (whether those previously measured/determined and subsequently stored in the database, or new entries for the product being made) is indicative of a degree of warpage in a single corrugated sheet in the stack 70, multiple corrugated sheets in the stack 70, or all of the sheets in the stack 70.

Following the real-time feedback control from steps 4000 to 5000, in step 6000 the traveling web of corrugated board product 40 undergoes further processing steps (e.g., slitting, scoring, and cutting via the corresponding slitter scorer 600 and cutter device 700) until ultimately individual boards therefrom are stacked by the stacker 800 to yield the stack 70 of individually prepared corrugated board sheets (e.g., as schematically shown in FIG. 6).

In step 7000, the post-warp detector 1100 (e.g., a human operator or an imaging device such as a camera, laser, etc.) measures or determines the post-warp of the corrugated product sheets in the stack 70. While the initial warp detection is made during manufacturing while the web of corrugated board product 40 is undergoing processing (e.g., via the flotation and detection apparatus 900 and preferably under enhanced resolution), the subsequently produced sheets (e.g. after slitting/scoring and cutting) will not be subject to warp enhancement and may undergo additional warpage (post-warp) downstream of the initial measurement, for example after the individual sheets have been prepared and stacked in stack 70. This can result, for example, due to additional drying that may occur after the initial warp measurement, as well as further deviations in the degrees of drying between the opposed liners in the final sheets. In order to observe such post warp compared to the initial warp measurement, it is important for the post-warp detection to be made at least a predetermined amount of time after the initial warp detection (such as at least 30 seconds later as noted above). Preferably, this determination is made after the individual sheets have been stacked in stack 70, because it can be easier to detect final post-warp in stacked sheets than in a single sheet.

The detected degree of post-warp, as compared to the initial degree of detected warpage, may be dependent on multiple factors, such as the grade of the corrugated product, ambient temperature, relative humidity, other environmental factors, manufacturing parameters such as the source and composition of the raw materials, conditions under which they were made, etc. Of note, the detected degree of post-warp may be a measured value using a sensor such as those described herein, or simply a visual determination from a human operator. For example, if an operator visually inspects the stack 70, the detected degree of post-warp may be a binary determination, i.e., whether the stack 70 (or boards therein) appear flat or appear warped. Whereas, when measured using a sensor, the detected degree of warp can be quantified as a value that can be evaluated to ensure that it remains within an acceptable tolerance band of flatness.

As noted, it is desirable to use the relationship between initial warp measurements at the flotation and detection apparatus 900 and post-warp measurements at the post-warp detector 1100 predictively to determine an appropriate amount of conditioning (e.g., moisture application) for the various liners and medium assembled to make corrugated board in the corrugating apparatus 1000; all in order that the finished corrugated product made therefrom, incorporating all of its layers, will be flat, or at least within an acceptable tolerance range of flat. For example, knowing the initial warp measurement at the flotation and detection apparatus 900 and understanding how that initial warp measurement is likely to change by the time the stack 70 is formed (i.e. so that the sheets therein are allowed to equilibrate for a predetermined time after manufacturing or after the initial warp measurement), one can tune the conditioning setpoints (e.g., moisture conditioning level) to achieve a degree of warp at the flotation and detection apparatus 900 that will equate to flat board at the post-warp detector 1100 in the stack 70, exhibiting little (e.g., imperceptible) to no warpage.

The data-measurement and feedback-control architecture described herein can operate continuously during a manufacturing operation for producing a multilayer corrugated-board product, so that moisture-conditioning setpoints can be continuously updated or adjusted based on real-time monitoring of initial-warp and post-warp values under the prevailing conditions (which also may be susceptible to change over time). This is particularly useful during periods when disruptions will be introduced to the manufacturing operation, especially during successive roll change operations wherein spent rolls of feedstock materials for the respective layers (e.g., the first-face sheet web, the second-face sheet web, and/or the medium material) are being swapped for new rolls of the same or a different material in a continuous process. Implementing a roll change (and especially one involving swapping different materials) tends to disrupt the current operating settings of the system. As the apparatus and method described above implements moisture adjustments to individual layers of the multi-layer product in real-time, minimal lag occurs between the start of the roll-change operation and the point where the finished multi-layer product (i.e., stacked in sheets 70) is restored to flat (or within an acceptable tolerance range of flat) in case a disruption during that change otherwise may have upset post-warp flatness.

At step 8000, by tabulating the initial and post-warp measurements (and other factors such as the grade of the corrugated product, ambient temperature, relative humidity, other environmental factors, etc.) one constructs and continually updates the aforementioned database of correlated initial- and post-warp values associated with their respective conditioning. This database then is used by the controller 1200 to select appropriate conditioning setpoints, under the prevailing conditions, that when applied will yield a measured initial warp value at the flotation and detection apparatus 900 that correlates to a post-warp value at the post-warp detector 1100 representative of finished boards (or a stack 70 of them) having little to no warpage (or warpage within an acceptable tolerance band of flat). Indeed, this database is referenced by the controller 1200 during step 5000 in order that the conditioning setpoints (e.g., moisture application levels) for the liners/medium in the corrugating apparatus 1000 be continuously adjusted in real-time.

In sum, the aforementioned method corrects and/or maintains a production run of corrugated board in terms of the degree of moisture conditioning applied to elements used to construct the board, based on real-time feedback of measured warpage and adjusted using predetermined and evolving correlations between measured warpage during manufacturing, and predicted post-warp flatness. The controller 1200 ultimately selects the conditioning setpoints (for the real-time feedback control) based on historical data representing an initial warp measurement that coincides with a post-warp measurement being within the desired flatness tolerance under similar or the same prevailing conditions. Indeed, throughout a production run, and indeed numerous and successive production runs, further data entries are acquired and stored in the database so that future predictive selections of historical initial warp measurements (and their corresponding conditioning setpoints) can be made with greater accuracy.

The above-described detection apparatus and method of reducing post-warp has been described in relation to conventional single-wall corrugated products; i.e. those having two outer face sheets opposed to a single common corrugated medium. However, it is contemplated that the same apparatus and comparable methods can likewise be implemented in a corrugating apparatus configured to produce double-wall corrugated board sheets (i.e., including two corrugated mediums, each disposed between an outer face sheet and an intermediate face sheet, the latter being common to both corrugated mediums), or higher-order corrugated board sheets having more than three layers of medium stacked between adjacent face-sheets. For example, the corrugating apparatus may include, e.g., three to seven separate moisture applicators, each configured to independently apply moisture to a corresponding layer of the single-wall, double-wall, or higher-order-walled corrugated board product The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims and their equivalents.

What is claimed is:

1. A method of correcting post-warp in a multi-layer product under prevailing conditions, the method comprising:
detecting an initial warp value of the multi-layer product indicative of an initial degree of warpage therein;
selecting a first moisture-conditioning setpoint based on a database correlating a plurality of moisture-conditioning setpoints to respective initial warp values and their associated post-warp values for prior-made multi-layer products, said post-warp values being indicative of a degree of post-warp in the respective prior-made multi-layer products, wherein said selection is based on a comparison between the detected initial warp value and the respective initial warp values in the database; and
adjusting a moisture content in a first layer of the multi-layer product according to the selected first moisture-conditioning setpoint,
wherein the multi-layer product is not in contact with any solid surface at a location where the initial warp value thereof is detected.

2. The method of claim 1, further comprising detecting a post-warp value of the multi-layer product and updating the database to correlate the detected post-warp and initial warp values to the selected first moisture-conditioning setpoint under the prevailing conditions.

3. The method of claim 2, wherein the detection of the post-warp value occurs at least 30 seconds after the detection of the initial warp value.

4. The method of claim 1, wherein the multi-layer product is supported by a cushion of air at the location where the initial warp value is detected.

5. The method of claim 1, wherein the multi-layer product is supported by a cushion of air at a fixed height above a flotation column at the location where the initial warp value is detected.

6. The method of claim 1, further comprising enhancing the degree of warpage of the multi-layer product prior to or during detecting the initial warp value.

7. A method of correcting post-warp in a multi-layer product under prevailing conditions, the method comprising:
detecting an initial warp value of the multi-layer product indicative of an initial degree of warpage therein;
enhancing the degree of warpage of the multi-layer product prior to or during detecting the initial warp value;
selecting a first moisture-conditioning setpoint based on a database correlating a plurality of moisture-conditioning setpoints to respective initial warp values and their associated post-warp values for prior-made multi-layer products, said post-warp values being indicative of a degree of post-warp in the respective prior-made multi-layer products, wherein said selection is based on a comparison between the detected initial warp value and the respective initial warp values in the database; and
adjusting a moisture content in a first layer of the multi-layer product according to the selected first moisture-conditioning setpoint,
wherein the degree of warpage is enhanced via a cushion of air emitted from a flotation column that reduces a radius of curvature in, thereby enhancing warpage of, the multi-layer product in a cross-travel direction thereof.

8. The method of claim 1, wherein the initial warp value is detected by a warp detection apparatus.

9. The method of claim 8, wherein the warp detection apparatus comprises an imaging device.

10. A method of correcting post-warp in a multi-layer product under prevailing conditions, the method comprising:
detecting an initial warp value of the multi-layer product indicative of an initial degree of warpage therein;
selecting a first moisture-conditioning setpoint based on a database correlating a plurality of moisture-conditioning setpoints to respective initial warp values and their associated post-warp values for prior-made multi-layer products, said post-warp values being indicative of a degree of post-warp in the respective prior-made multi-layer products, wherein said selection is based on a comparison between the detected initial warp value and the respective initial warp values in the database; and
adjusting a moisture content in a first layer of the multi-layer product according to the selected first moisture-conditioning setpoint,
wherein the initial warp value is detected by a warp detection apparatus, and wherein the initial warp value is detected at a location where the multi-layer product is supported by a cushion of air.

11. The method of claim 1, wherein the initial warp value is detected at a location directly downstream from a double-backer of a corrugating apparatus.

12. The method of claim 1, further comprising:
selecting a second moisture-conditioning setpoint based on said database, said first and second moisture-conditioning setpoints being correlated together in said database; and
adjusting a moisture content in a second layer of the multi-layer product according to the selected second moisture-conditioning setpoint.

13. The method of claim 1, wherein selecting the moisture-conditioning setpoint is performed by an artificial intelligence model trained based in part on the database.

14. An apparatus for producing a multi-layer product, comprising:
a moisture conditioning apparatus for adjusting a moisture content in a layer of the multi-layer product prior to assembly of the multi-layer product;
a flotation column operable to support the multi-layer product at a variable height above the flotation column on a cushion of air;

a warp detection apparatus; and a non-transitory computer-readable medium storing a database and a program, said program comprising instructions, wherein the instructions, when executed by a processor of an electronic device, causes the electronic device to:

detect an initial warp value of the multi-layer product via the warp detection apparatus that is indicative of a degree of warpage therein under prevailing conditions;

select a moisture-conditioning setpoint based on a database correlating a plurality of moisture-conditioning setpoints to respective initial warp values and their associated post-warp values for prior-made multi-layer products, said post-warp values being indicative of a degree of post-warp in the respective prior-made multi-layer products, wherein said selection is based on a comparison between the detected initial warp value and the respective initial warp values in said database; and adjust the moisture content in the layer via the moisture conditioning apparatus according to the selected moisture-conditioning setpoint.

15. The apparatus of claim 14, wherein the multi-layer product has opposite first and second surfaces, wherein the first surface faces the flotation column, and wherein the warp detection apparatus faces the first surface.

16. The apparatus of claim 14, wherein the multi-layer product is an uncut, unscored double-faced corrugated board product.

17. The apparatus of claim 16, wherein the warp detection apparatus is located directly downstream from a double-backer in a travel direction of the corrugated board product.

18. The apparatus of claim 14, further comprising a moisture sensor positioned downstream from the warp detection apparatus in a travel direction of the multi-layer product, said moisture sensor configured to determine a moisture content of the multi-layer product.

* * * * *